United States Patent [19]

Enomoto et al.

[11] Patent Number: 5,553,106

[45] Date of Patent: Sep. 3, 1996

[54] RESIDUAL STRESS IMPROVING METHOD FOR MEMBERS IN REACTOR PRESSURE VESSEL

[75] Inventors: Kunio Enomoto, Ibaraki-ken; Masahiro Otaka, Hitachi; Kazuo Amano, Hitachi; Koichi Kurosawa, Hitachi; Eisaku Hayashi, Hitachi; Ren Morinaka, Hitachi; Shigeo Hattori, Ibaraki-ken; Kasunori Sato, Kure, all of Japan

[73] Assignees: Hitachi, Ltd.; Babcock-Hitachi Kabushiki Kaisha, both of Tokyo, Japan

[21] Appl. No.: 490,245

[22] Filed: Jun. 14, 1995

[30] Foreign Application Priority Data

Jun. 15, 1994 [JP] Japan ..................... 6-132746

[51] Int. Cl.⁶ .................................................. G21C 19/00
[52] U.S. Cl. .................. 376/305; 376/316; 148/605; 148/644; 134/108; 134/184; 266/134
[58] Field of Search ..................... 376/277, 305, 376/310, 316; 266/114, 130, 133, 134; 148/605, 606, 638, 644; 134/108, 166 R, 184; 239/13, 132.5; 299/17; 451/39, 40

[56] References Cited

U.S. PATENT DOCUMENTS

| | | | |
|---|---|---|---|
| 4,702,880 | 10/1987 | Porowski et al. | 376/305 |
| 4,714,053 | 12/1987 | Perry | 134/166 R |
| 4,842,655 | 6/1989 | Porowski et al. | 376/305 |
| 4,948,435 | 8/1990 | Butler et al. | 148/605 |
| 5,305,361 | 4/1994 | Enomoto et al. | 376/316 |

FOREIGN PATENT DOCUMENTS

| | | |
|---|---|---|
| 53-21021 | 2/1978 | Japan . |
| 60-258409 | 12/1985 | Japan . |
| 62-63614 | 3/1987 | Japan . |
| 4-362124 | 12/1992 | Japan . |
| 5-78738 | 3/1993 | Japan . |
| 5-195052 | 8/1993 | Japan . |

Primary Examiner—Daniel D. Wasil
Attorney, Agent, or Firm—Antonelli, Terry, Stout & Kraus

[57] ABSTRACT

Low temperature water in a low temperature water tank 12 installed outside a reactor pressure vessel 9 is pumped by a high pressure pump 15 and supplied through a conductor 17 under pressure. The supplied water is ejected, as a stream of cold water jet 8, from a nozzle 14 connected to the conductor 17 and introduced into the reactor pressure vessel 9 by a driving mechanism. The stream of cold water jet 8 ejected from the nozzle 14 is directed to impinge against a predetermined position of a core shroud 13 in reactor water 11 filled in the reactor pressure vessel 9 and being at temperature higher than the low temperature water. Then, while continuing to eject the cold water jet 8 from the nozzle 14, the nozzle 14 is moved away from the predetermined position, or the ejection of the cold water jet 8 from the nozzle 14 is stopped, allowing the predetermined position to be heated again with the temperature of the reactor water 11. A thermal shock is thereby applied to the predetermined position for improvement in residual stress of the core shroud 13.

11 Claims, 9 Drawing Sheets

RESIDUAL STRESS IMPROVING METHOD FOR MEMBERS IN REACTOR PRESSURE VESSEL

BACKGROUND OF THE INVENTION

The present invention relates to a residual stress improving method for members in a reactor pressure vessel.

It is generally known that metallic materials such as austenite stainless steel used for members in a nuclear plant pressure vessel cause intergranular stress corrosion cracking (hereinafter abbreviated as IGSCC) in welded portions of the members or thereabout when disposed in water at high temperature within the reactor.

IGSCC is caused under conditions where three factors of materials, i.e., sensitization, tensile stress, and corrosive environment, are combined with each other.

Sensitization of materials is developed owing to that the welding heat, for example, precipitates a chromium carbide in the grain boundary and, hence, a Cr depleted layer which is more sensitive to corrosion is formed near the grain boundary (this process being called sensitization).

Tensile stress is produced in combination of stress caused by an external force and tensile residual stress caused in a material surface during processes of welding and machining.

Corrosive environment is developed with the presence of high temperature water containing dissolved oxygen.

IGSCC can be prevented by eliminating any one of those three factors.

Examples of known prior art for improving residual stress in a material surface, that is the cause of producing tensile stress, aiming to prevent IGSCC are as follows.

(1) JP, A, 62-63614

In this known prior art, a peening apparatus using high pressure water is inserted to pipes of a heat exchanger or the like, and a high pressure water jet is ejected from a rotating nozzle to effect peening for transformation from tensile residual stress of the pipe into compressive residual stress.

(2) JP, A, 5-78738

In this known prior art, a water jet is ejected from a nozzle toward surfaces of members in a reactor plant pressure vessel in water for impinging a water jet stream accompanied with cavitation bubbles against the member surface. As a result, the member surface is subjected to peening for effective transformation from tensile residual stress in the member surface into compressive residual stress.

(3) JP, A, 53-21021

In this known prior art, an induction heating coil is disposed around a pipe of austenite stainless steel to heat the pipe, and cooling water is then ejected into the pipe to rapidly cool an inner surface of the pipe for transformation from tensile residual stress in the pipe inner surface into compressive residual stress.

(4) JP, A, 60-258409

In this known prior art, small balls or the like at low temperature are blown toward a surface of a metallic member at a high speed to effect penning for transformation from tensile residual stress in the metallic member surface into compressive residual stress.

(5) JP, A, 4-362124

This known prior art discloses that high pressure water is ejected toward a surface of a metallic member from a nozzle in water or aquatic environment created in the atmosphere for impinging the ejected water accompanied with cavitation bubbles against the metallic member surface. With the energy produced when the cavitation bubbles collapse, the metallic member surface is peened to cause compressive residual stress in the metallic member surface. This known prior art also discloses that a horn-shaped nozzle adapted to easily produce the cavitation bubbles is used as the nozzle in the water.

(6) JP, A, 5-195052

This known prior art, corresponding to U.S. Pat. No. 5,305,361, discloses that a nozzle for ejecting high pressure water toward a surface of a metallic member in water is vibrated at high frequency to induce cavitation bubbles near a vibrating nozzle surface, and the cavitation bubbles are impinged along with a high pressure water stream ejected from the nozzle against the metallic member surface. With the energy produced when the cavitation bubbles collapse, the metallic member surface is peened to cause compressive residual stress in the metallic member surface. This known prior art also discloses that a horn-shaped nozzle adapted to easily produce the cavitation bubbles is used as the nozzle in the water.

However, the above-mentioned prior arts have problems as follows.

In the known prior art (1), a water jet ejected from a nozzle is impinged against a material surface in the atmosphere to effect peening with impinging pressure resulted by the ejected water jet. For nuclear plant materials which must be treated in water, the water jet would be diffused and its flow speed would be lowered due to resistance of the surrounding water before reaching the metal surface. Therefore, the peening effect cannot be achieved with a satisfactory result. Thus, the known prior art (1) has a difficulty in application to the nuclear plant materials.

To achieve satisfactory peening in the known prior art (2), a flow speed of the water ejected from a nozzle must be so very high that the water jet can produce cavitation bubbles in a sufficient amount. Accordingly, the known prior art (2) is disadvantageous in needing a pump of great horse power and, hence, entailing large-sized and intricate arrangements The known prior art (3) is applied to a pipe by winding an induction heating coil around the pipe to be treated. Therefore, the known prior art (3) cannot be applied to a large-sized structure and, hence, has a difficulty in practical use for improving residual stress of large-sized members in a reactor pressure vessel.

In the known prior art (4), blowing small balls or the like in water is difficult because of resistance of the surrounding water as with the above known prior art (1). Also, it is very troublesome to collect the blown small balls or the like when the treating operation is carried out in the nuclear plant. Thus, the known prior art (4) has a difficulty in application to the nuclear plant materials.

To achieve satisfactory peening in the known prior art (5), a flow speed of the ejected water must be so very high, as with the above known prior art (2), that the water jet can produce cavitation bubbles in a sufficient amount. Accordingly, the known prior, art (5) is also disadvantageous in needing a pump of great horse power and, hence, entailing large-sized and intricate arrangements.

The known prior art (6) requires complicated arrangements because a means for vibrating the nozzle at high frequency is needed to produce cavitation bubbles in a sufficient amount.

Further, in attempting to improve residual tensile stress of members in a reactor pressure vessel, any of the foregoing prior arts raises a problem that the size and complexity of equipment used for the improvement, such as a pump and a heating/cooling apparatus, is increased.

Accordingly, there has been a demand for improving residual tensile stress of members in a reactor pressure vessel while preventing the necessity of large-sized and intricate equipment as far as possible.

An object of the present invention is, therefore, to provide a residual tensile stress improving method for members in a reactor pressure vessel which can improve residual tensile stress of the members in the reactor pressure vessel with simple arrangements.

SUMMARY OF THE INVENTION

A first invention is in a residual stress improving method for members in reactor pressure vessel, the method comprising a first step of ejecting, toward a first region in a surface of members in reactor pressure vessel submerged in reactor water, a water jet in the form of a high speed submerged water jet at temperature lower than any temperatures of the reactor water and the members in reactor pressure vessel from a nozzle to impinge against the first region in water environment, and a second step of stopping the impingement of the water jet against the first region, allowing the first region to be heated again.

A second invention is in a residual stress improving method for members in reactor pressure vessel according to the first invention, wherein the second step comprises moving the nozzle while ejecting the water jet from the nozzle such that the water jet impinges toward a second region different from the first region of members in reactor pressure vessel.

A third invention is in a residual stress improving method for members in reactor pressure vessel according to the first invention, wherein the second step comprises stopping the ejection of the water jet from the nozzle.

A fourth invention is in a residual stress improving method for members in reactor pressure vessel according to the first, second or third invention, wherein an initial ejection speed of the water jet from the nozzle is not less than 100 m/s, but not larger than 700 m/s.

A fifth invention is in a residual stress improving method for members in reactor pressure vessel according to the first, second or third invention, wherein an initial ejection speed of the water jet from the nozzle is not less than 200 m/s, but not larger than 400 m/s.

A sixth invention is in a residual stress improving method for members in reactor pressure vessel according to the first, second or third invention, wherein an initial ejection speed of the water jet from the nozzle is not less than 250 m/s, but not larger than 350 m/s.

A seventh invention is in a residual stress improving method for members in reactor pressure vessel according to the first, second or third invention, wherein a source of the water jet is low temperature water obtained by cooling the reactor water and pumping the same under pressure.

An eighth invention is in a residual stress improving method for members in reactor pressure vessel according to the first, second or third invention, wherein a source of the water jet is low temperature water prepared outside the reactor pressure vessel and pumped under pressure.

A ninth invention is in a residual stress improving method for members in reactor pressure vessel according to the first, second or third invention, wherein a source of the water jet is low temperature pure water prepared outside the reactor and pumped under pressure.

A tenth invention is in a residual stress improving method for members in reactor pressure vessel according to the first, second or third invention, wherein the water jet is high speed jet water including cavitation bubbles.

An eleventh invention is in a residual stress improving method for members in reactor pressure vessel according to the first, second or third invention, wherein the nozzle is a an elbow-shaped nozzle for ejecting the high speed submerged water jet at a predetermined angle with respect to the inflow direction of high pressure water supplied to the nozzle.

DESCRIPTION OF PREFERRED EMBODIMENTS

First of all, the first principle of the present invention will be described below with reference to FIG. 2.

The first principle resides in a method of impinging, against a member surface in water, a high speed water jet at temperature lower than that of the water or the member surface to produce thermal shock stress in a member used in a reactor pressure vessel, thereby reducing tensile residual stress of the member in the reactor pressure vessel or transforming it into compressive stress.

The first principle will be described below in more detail with reference to an apparatus shown in FIG. 2.

Figure 2:
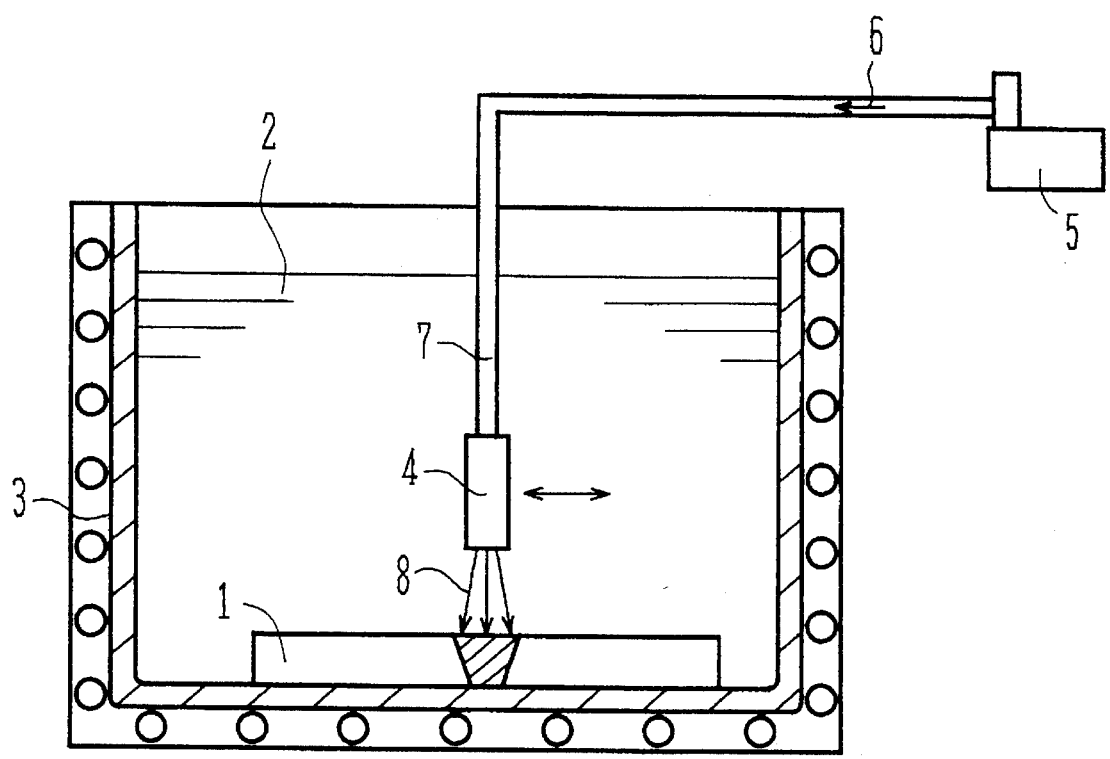
FIG. 2 is a sectional view of equipment used for explaining the first principle of the present invention.

As shown in FIG. 2, high temperature water 2 of 40° C. to 100° C. is filled in a high temperature tank 3.

A metallic member 1 is set to be submerged in the high temperature water 2.

A nozzle 4 is set to be submerged in the high temperature water 2.

Cold water 6 at low temperature (e.g., 20° C.) is pumped under pressure by a high pressure pump 5 and is introduced to the nozzle 4 through a conductor 7.

Therefore, a cold water jet 8 in the form of a high speed submerged water jet is ejected from the nozzle 4. The cold water jet 8 ejected from the nozzle 4 impinges against a surface of the metallic member 1.

The nozzle 4 is moved in the horizontal direction (as indicated by arrow) in FIG. 2 along the surface of the metallic member 1 while ejecting the cold water jet 8.

Next, the operation of improving residual stress will be described with reference to FIG. 3.

Figure 3:
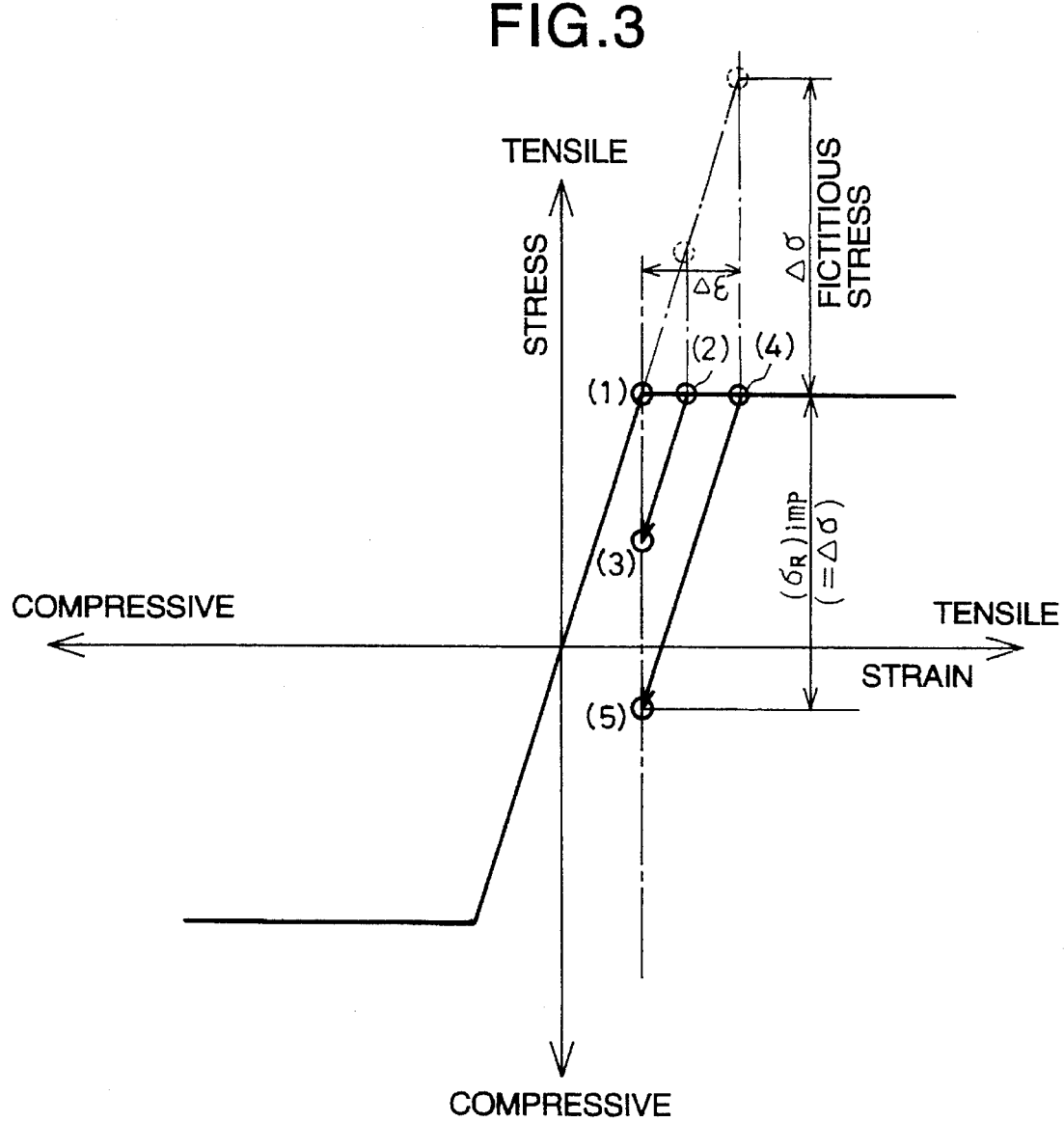
FIG. 3 is a graph of the stress-strain curve of a metallic member shown in FIG. 2.

FIG. 3 is a graph showing the stress (ε)-strain (σ) curve of a metallic member shown 1.

The vertical axis of the graph represents stress that is tensile stress in the upper half and compressive stress in the lower half, whereas the horizontal axis represents strain that is tensile strain in the right half and compressive strain in the left half Generally, tensile residual stress on the order of yield stress exists in the surface of the metallic member 1 as a result of manufacturing process, welding and so forth in an initial state.

This initial state is indicated by a point (1) on the stress-strain curve shown in FIG. 3.

At the beginning, a surface layer of the metallic member 1 has the same temperature as the high temperature water 2. In a certain region against which the cold water jet 8 impinges (hereinafter referred to as an impingement region), however, there occurs a transient temperature difference ΔT between the surface layer and a subsurface layer of the metallic member 1 because of rapid cooling by the cold water jet 8. The temperature difference ΔT between the surface layer and the subsurface layer brings about a thermal shock to cause fictitious tensile stress Δσ, the actual tensile stress $\Delta\sigma_{act}$ and tensile strain Δε in the surface layer.

The fictitious tensile stress Δσ and the tensile strain Δε caused at this time are expressed below:

$$\Delta\epsilon = \alpha \times \Delta T \times F$$

$$\Delta\sigma = E \times \Delta\epsilon/(1-\nu)$$

where

α: coefficient of linear thermal expansion

ν: Poisson's ratio

F: strain restriction Coefficient (F≤1 in this case)

E: modulus of elasticity

Supposing now a residual stress improving operation to be carried out in inspecting a reactor pressure vessel, for example, the resulting fictitious tensile stress and tensile strain are given, respectively, by Δσ≤300 MPa and Δε≤0.15% on condition of the coefficient of linear thermal expansion $\alpha = 17 \times 10^{-6}$ mm/mm° C., Poisson's ratio ν=0.3, the strain restriction coefficient F=1, and the coefficient of longitudinal elasticity $E = 2 \times 10^5$ MPa, taking into account the physical properties of austenite stainless steel or Inconel used as a material for members in the reactor pressure vessel, as well as Δ=60° C., taking into account a relatively high temperature of the reactor water during the inspection.

If the initial residual stress due to the manufacturing process, etc. does not exist in the metallic member 1, the thermal shock stress of about 300 MPa would be wholly developed in the metallic member 1. But when tensile stress close to yield stress remains already in the metallic member 1, as mentioned above, the surface layer is partly yielded while strain of Δε≤0.15% is developed and, therefore, the stress is not so increased in the surface layer. Thus, the surface state is changed from the point (1) to a point (4) in FIG. 3.

After that, the impingement region of the metallic member 1 rapidly cooled by the impingement of the cold water jet 8 is heated again to the same temperature as the high temperature water 2, whereupon the transiently occurred temperature difference ΔT disappears.

Since the thermal shock stress resulted from the temperature difference also disappears, the impingement region in the surface layer of the metallic member 1 elastically reverts from the partly yielded state, under the elastic restriction. Accordingly, the surface state is changed from the point (4) to a point (5) in FIG. 3.

In other words, based on the first principle described above, the residual stress improving method of this embodiment can improve the surface state of the metallic member from the initial tensile residual stress state of (1) to a compressive residual stress state of (5).

Even when the temperature of the cold water jet 8 is not so low and the transient temperature difference ΔT between the surface layer and the subsurface layer is relatively small, the surface state can be changed from the point (1)→point (2)→point (3), for example, in FIG. 3 depending on a value of the temperature difference. It is thus possible to improve the surface state of the metallic member from the initial tensile residual stress state of (1) to a state of (3) where the tensile stress is reduced.

Thus, according to the first principle, the stress state of a metallic member is improved by impinging, against the metallic member, a cold water jet at temperature that is low enough to produce a temperature difference with respect to the ambient water temperature,i and causing thermal shock stress in a surface layer of the metallic member.

Also, according to the first principle, since cavitation bubbles are not positively utilized, there is no necessity of using a pump of great horse power to increase a flow speed of the cold water jet ejected from the nozzle and, hence, the size of necessary equipment is held down.

The second principle will be described below with reference to FIG. 4.

Figure 4:
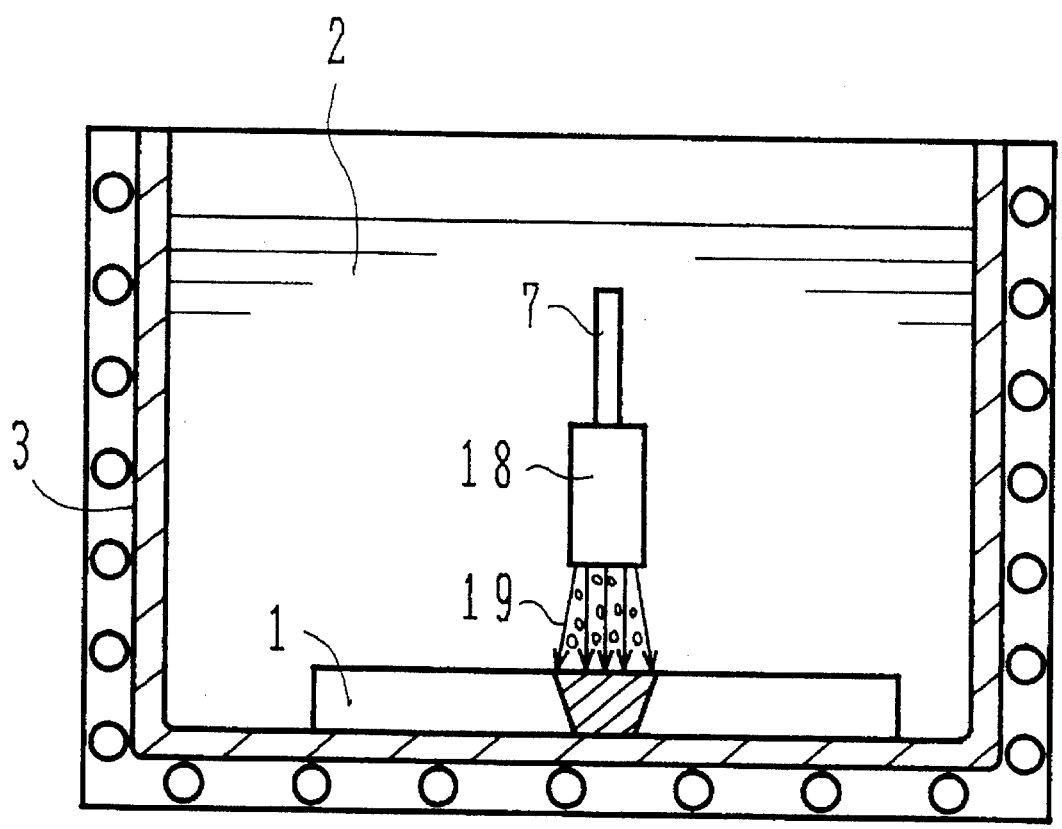
FIG. 4 is a sectional view of equipment used for explaining the second principle of the present invention.

Arrangements shown in FIG. 4 are different from those shown in FIG. 2 for explaining the first principle in that a nozzle 18 adapted to accelerate cavitation (e.g., a horn-shaped nozzle which ejects a water jet in the form broadening toward the end) is provided at the end of the conductor 7 instead of the normal nozzle 4, thereby ejecting a cold water cavitation jet 19 including cavitation bubbles.

The remaining arrangements are the same as shown in FIG. 2, and identical components to those in FIG. 2 are denoted by the same reference numerals and will not be here described.

With the residual stress improving method based on the second principle, as shown in FIG. 4, a water jet ejected from the nozzle 18 is provided as the cold water cavitation jet 19 including cavitation bubbles and, therefore, a high speed turbulent flow is generated to enhance the cooling effect. As a result, stress is caused by a stronger thermal shock and the residual stress improving effect is enhanced correspondingly.

Further, when the cavitation bubbles impinge against the member surface and collapse there, high pressure is produced to induce bearing stress in the surface of the metallic member 1. Therefore, the residual stress improving effect by the so-called peening is developed in addition to the thermal effect of improving residual stress, which maximizes the residual stress improving effect.

Thus, according to the second principle, since the residual stress improving effect by the peening utilizing cavitation bubbles is added to the residual stress improving effect by a thermal shock, even if the cavitation bubbles are not so sufficiently produced as compared with the case of achieving the residual stress improving effect by only the peening utilizing cavitation bubbles, the satisfactory residual stress improving effect can be achieved with the stress improvement additionally enhanced by applying a thermal shock. As a result, these is no necessity of using a pump of great horse power to increase a flow speed of the cold water jet ejected from the nozzle and, hence, the size of necessary equipment is held down.

A first embodiment of the present invention based on the first principle will now be described below with reference to FIGS. 1, 5 and 6.

This embodiment intends to improve residual stress of a core shroud as a member in a pressure vessel of a boiling water reactor based on the above-explained first principle.

Prior to starting the method of improving residual stress of the member in a reactor pressure vessel according to this embodiment, a top cover of a pressure vessel 9 of a reactor 21 is removed, and a steam drier, a steam separator and fuel assemblies (not shown) are taken out successively. Then, the pressure vessel 9 is filled with reactor water 11 at high temperatures (40° C. to 100° C.) completely to a level above a top guide 10.

Figure 5:
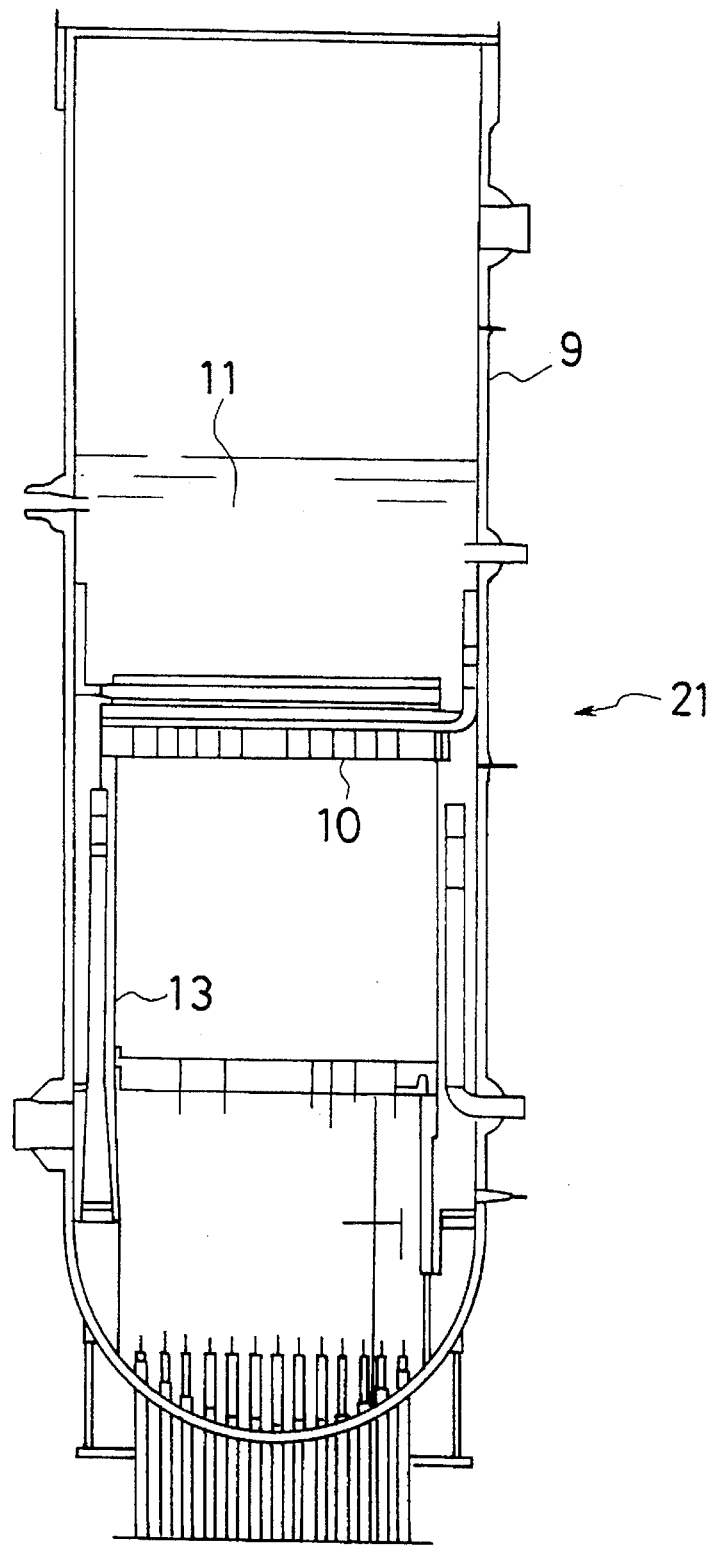
FIG. 5 is a sectional view Of the reactor pressure vessel in the condition just before the residual stress improving method according to the first embodiment of the present invention is applied.

That condition is illustrated in FIG. 5.

The temperature of the reactor water 11 is adjustable with friction heat by driving a recirculation pump associated with the nuclear plant or reactor.

Next, a nozzle 14 connected through a conductor 17 to a low temperature water tank 12 and a high pressure pump 15, which are installed outside the reactor 21, is introduced into the pressure vessel 9 by a driving mechanism (not shown) such that the nozzle is moved to face a predetermined position of the core shroud 13.

The driving mechanism may be of the same arrangements as those of a water jet peening apparatus disclosed in JP, A, 5-78738, for example.

More specifically, the driving mechanism comprises a circumferentially movable carriage provided at a top of the pressure vessel 9 to be able to move in the circumferential direction of the pressure vessel 9, a radially movable carriage provided on an upper surface of the circumferentially movable carriage to be able to move in the radial direction of the pressure vessel 9, and a mast suspended from the radially movable carriage and divided into multiple stages to be able to telescopically extend and contract in the vertical direction. The nozzle 14 is attached to a lowest end of the mast 14.

Though not specifically shown, the conductor 17 has a divided structure similarly to the mast of the driving mechanism so that it can also telescopically extend and contract in the vertical direction or in the radial direction.

With such arrangements of the driving mechanism and the conductor 17, the nozzle 14 can be radially and vertically moved in the pressure vessel 9 and smoothly guided to the predetermined position in the pressure vessel 9 while the conductor 17 is kept connected to the high pressure pump 15.

Subsequently, cold water (e.g., 20° C.) in the low temperature water tank 12 is pumped by the high pressure pump 15 and is supplied to the conductor 17 under pressure. The supplied water is ejected as a high speed cold water jet 8 from the nozzle 14 to impinge against a predetermined region of the core shroud 13 in the reactor water 11 at high temperature.

Figure 1:
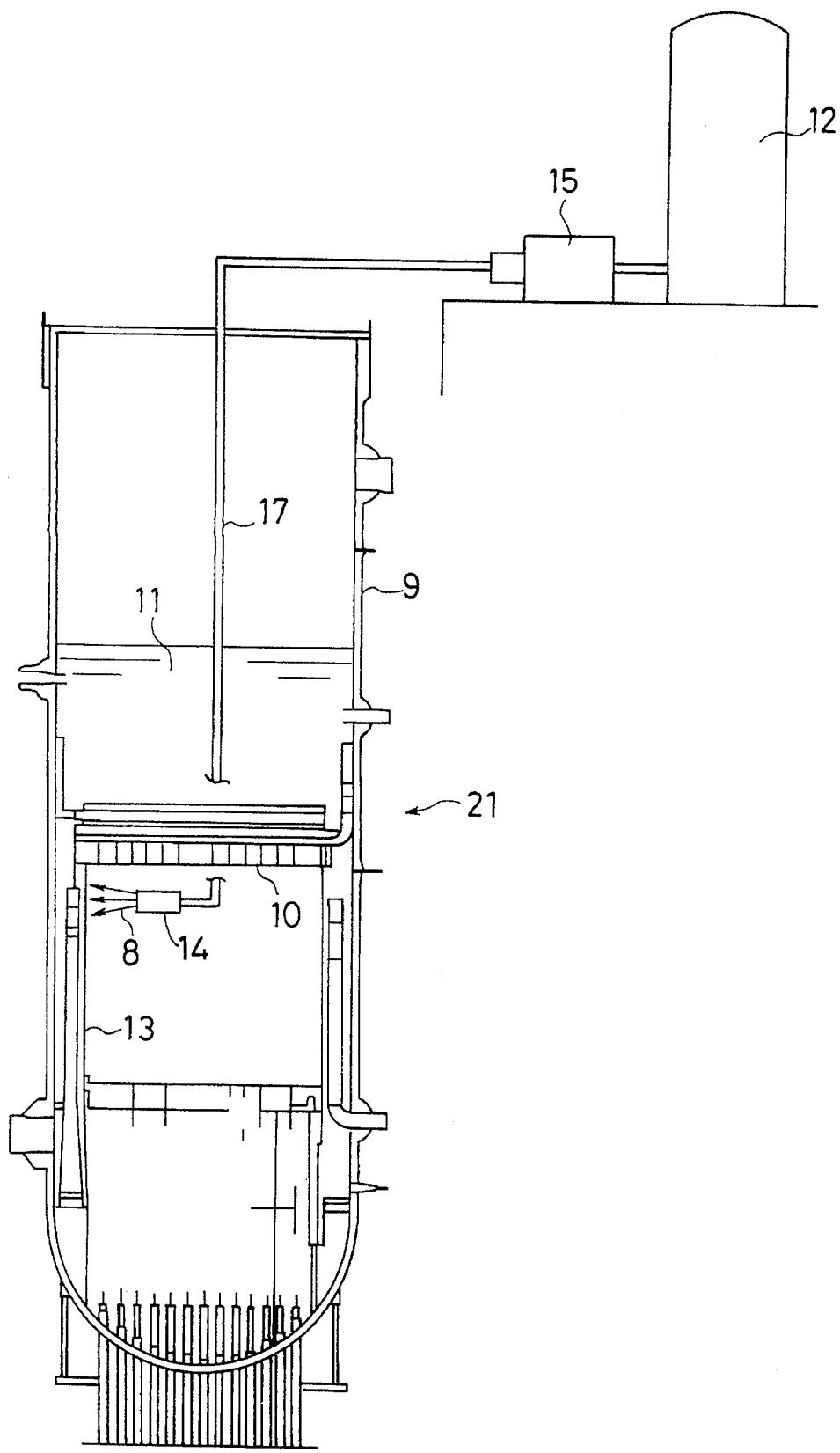
FIG. 1 is a sectional view of a reactor pressure vessel in the condition where a residual stress improving method according to a first embodiment of the present invention is applied.

That condition is illustrated in FIG. 1.

At this time, an ejection speed of the cold water jet 8 is preferably not less than 100 m/s in order to increase the heat conductivity between the cold water jet 8 and a surface layer of the core shroud 13 and to achieve the satisfactory residual stress improving effect, but the ejection speed is also preferably not larger than 700 m/s from limitations on a capability of the high pressure pump 15.

Further, taking into account that scales are peeled off from the core shroud 13 and may give rise to an adverse effect due to their grinding action if the cold water jet 8 exceeds a certain high speed, and that a sufficient allowance must be provided in reliability and durability of the equipment, such as the high pressure hose and the high pressure pump, in view of a great reaction force caused by the ejection of the cold water jet and severe radiation environment, the ejection speed of the cold water jet 8 is more preferably in the range of 200 m/s to 400 m/s.

Additionally, in consideration of operability of the nozzle and handling facility of the high pressure hose, the ejection speed of the cold water jet 8 is most preferably in the range of 250 m/s to 350 m/s.

After that, while continuing to eject the cold water jet 8 from the nozzle 14, the nozzle 14 is vertically moved by the above-mentioned driving mechanism (not shown) so that the nozzle is reciprocated to repeatedly impinge the cold water jet 8 against the same region several times.

Figure 6:
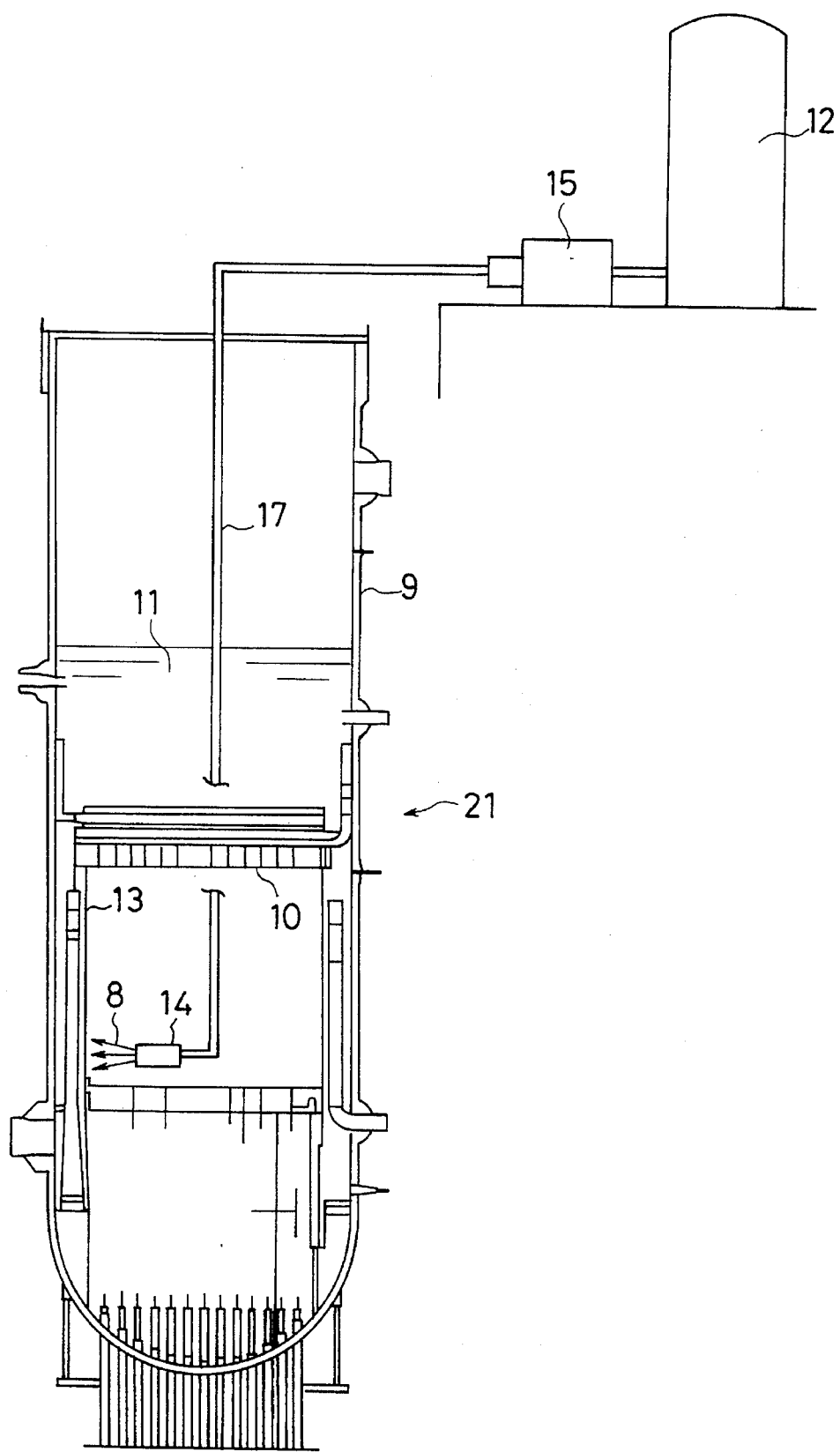
FIG. 6 is a sectional view of the reactor pressure vessel in another condition where the residual stress improving method according to the first embodiment of the present invention is applied.

FIG. 6 illustrates the condition where the nozzle 14 is moved to a lower position.

The nozzle 14 may be moved radially or circumferentially rather than vertically, or may be reciprocated by combined movements in the vertical direction and the radial or circumferential direction.

With this embodiment, in a first step, since the cold water jet 8 is ejected to impinge against and cool a surface layer of the core shroud 13 in a tensile stress residual state, the surface layer is subjected to tensile stress by a thermal shock to cause tensile strain and, simultaneously, it is partly yielded.

In a second step, since the nozzle 14 is moved away from the impingement region, the partly yielded surface layer becomes free from the cold water jet 8 and is heated again by the reactor water 11 at high temperature.

Accordingly, since the thermal shock stress applied to the surface layer disappears, the surface layer elastically reverts from the partly yielded state, for improvement to a state where tensile stress is relieved or to a compressive residual stress state.

It is thus possible to prevent the occurrence of intergranular stress corrosion cracking.

Also, the residual stress improving operation can be simply performed by simple arrangements with no need of disassembling or dismantling the core shroud.

When oxide scales or other contaminants are deposited on the surface layer of the core shroud 13, the oxide scales or the other contaminants are contracted by rapid cooling with the cold water jet 8 to cause shear strain at the boundary between the contaminants and the surface layer, allowing the contaminants to be easily peeled off.

In other words, cleaning of the surface contaminants on the core shroud 13 can be accelerated.

It is thus possible to prevent crevice aided stress corrosion cracking, fatigue cracking or the like induced by the oxide scales or the other contaminants.

Further, since the cold water jet 8 is ejected so as to repeatedly impinge against the same region by reciprocating the nozzle 14, the cleaning action is further increased.

While the core shroud 13 is cited in the foregoing embodiment as one example of the members of in the reactor pressure vessel to which the residual stress improving method is applied, the present invention is not limited to the illustrated embodiment, but also applicable to other reactor equipment, wall surfaces and so on.

While the temperature of the cold water jet 8 ejected from the nozzle 14 is set to 20° C. in the foregoing embodiment, the present invention is not limited to the illustrated embodiment. So long as the temperature of the cold water jet 8 is lower than any temperatures of the reactor water 11 and members in the reactor pressure vessel to be treated, the present invention can provide the similar effect. However, the more satisfactory residual stress improving effect by thermal shock stress is expected with the larger temperature difference. Therefore, the temperature of the cold water jet 8 is preferably held in the range of 0° C. to 40° C.

Further, while the foregoing embodiment is arranged so as to move the nozzle 14 while ejecting the cold water jet 8 from the nozzle 14 so that the surface layer is rapidly cooled by the cold water jet 8 and then heated again by the reactor water 11, the present invention is not limited to the illustrated embodiment. By way of example, a valve means or the like capable of opening and closing may be attached to the conductor 17, and the ejection of the cold water jet 8 from the nozzle 14 may be stopped by closing the valve means with the nozzle 14 kept intact. In this modified case, the present invention can also provide the similar effect. This method is particularly suitable for the case where the nozzle 14 is provided in plural number to perform the residual stress improving operation at a time or in a short time over a wide area of the member in the reactor pressure vessel to be treated.

While the normal nozzle 14 is attached to the end of the conductor 17 in the foregoing embodiment, the nozzle 18 adapted to accelerate cavitation may be used instead for utilization of the second principle explained in connection with FIG. 4. In this case, as described above, not only the residual stress improving effect, but also the effect of cleaning surface contaminants can be achieved at maximum.

A second embodiment of the present invention will be described below with reference to FIG. 7.

This embodiment intends to use pure water as being ejected to form the cold water jet.

Figure 7:
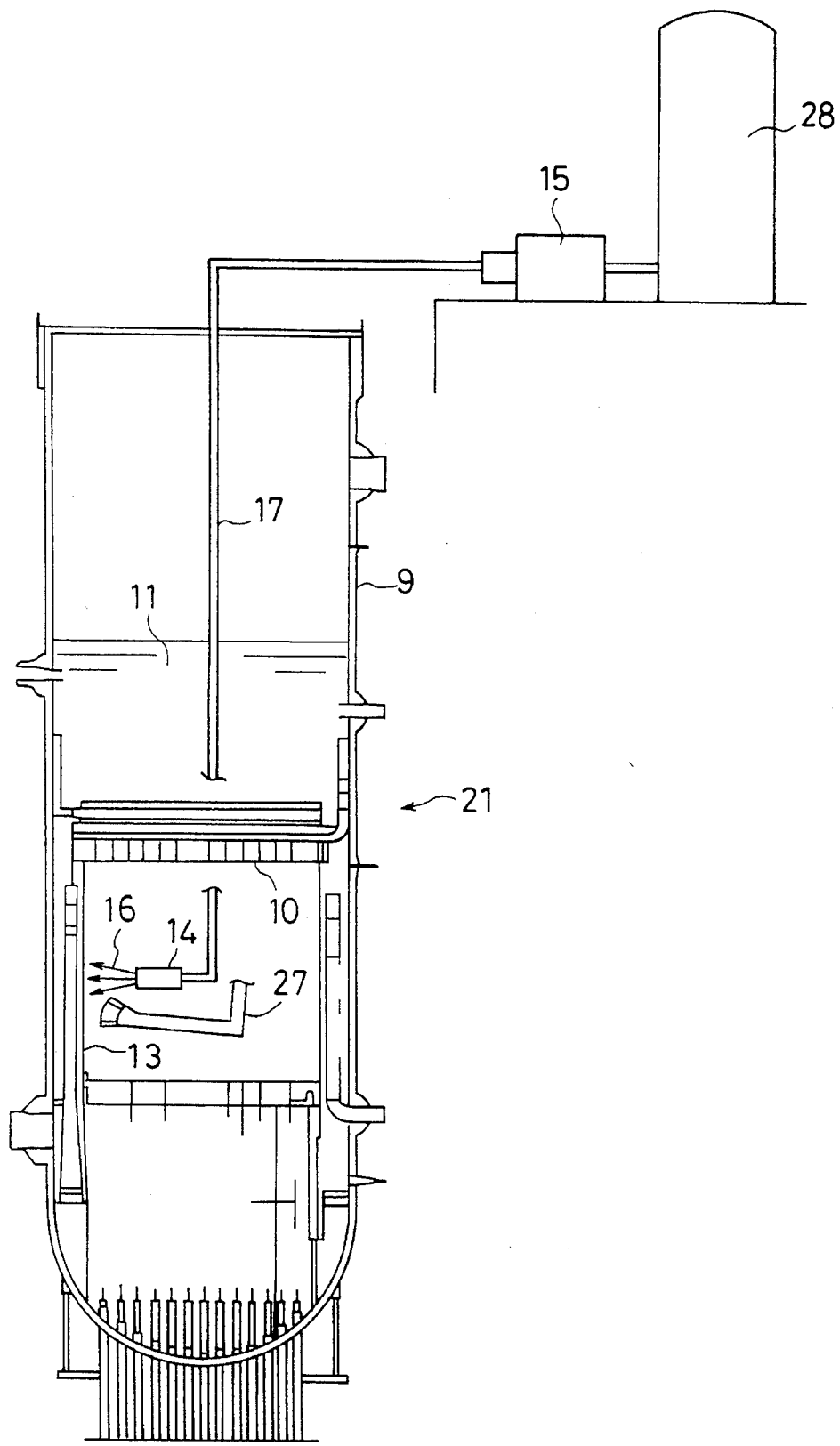
FIG. 7 is a sectional view of the reactor pressure vessel in the condition where a residual stress improving method according to a second embodiment of the present invention is applied.

FIG. 7 shows arrangements for ejecting the cold water jet according to a residual stress improving method of this embodiment.

Note that identical components in FIG. 7 to those in the first embodiment are denoted by the same reference numerals.

One point of differences between the arrangements of FIG. 7 and those of the first embodiment shown in FIG. 1 is that a low temperature pure water tank 28 is provided instead of the low temperature tank 12 to use pure water as working water.

Specifically, the pure water in the low temperature pure water tank 28 is pumped by the high pressure pump 15 and is ejected under pressure as a cold pure water jet 16 from the nozzle 14 through the conductor 17.

Another point of differences in arrangements between FIG. 7 and FIG. 1 is that a suction hose 27 is provided to suck or collect oxide scales or other contaminants peeled off.

The suction hose 27 is introduced into the pressure vessel 9 by a driving mechanism (not shown) similar to that used for the nozzle 14, or the driving mechanism for the nozzle 14, and is movable in the vertical and radial directions as with the nozzle 14.

The suction hose 27 is connected to a contaminant treating apparatus (not shown) installed outside the pressure vessel 9, and the oxide scales or the like sucked through the suction hose 27 is conveyed to the contaminant treating apparatus for treatment. The oxide scales or the like which have not been sucked through the suction hose 27 are treated by a cleaning apparatus (not shown) associated with the reactor 21 as the reactor water is recirculated.

The other arrangements and the operation steps are substantially the same as in the first embodiment.

With this embodiment, since the cold pure water jet 16 is ejected from the nozzle 14 by using the pure water as working water, the reactor water 11 will not be contaminated by addition of the working water.

It is thus possible to minimize contamination of the reactor water.

While the low temperature pure water tank 28 is provided in the foregoing embodiment, the present invention may also be practiced by branching a pipe from a pure water storing tank installed in the nuclear plant for resupply of the reactor water or other purposes and supplying pure water through the pipe, without providing the low temperature pure water tank 28. This modification is effective to eliminate the need of installing a separate tank.

Since the temperature of the pure water in the pure water storing tank is usually about 20° C., the stored pure water can be suitably used as the working water to form the cold pure water jet 16.

While water outside the reactor is used as the working water in the second embodiment, the reactor water may be used instead.

The case of using the reactor water will be described below as a third embodiment With reference to FIG. 8.

Figure 8:
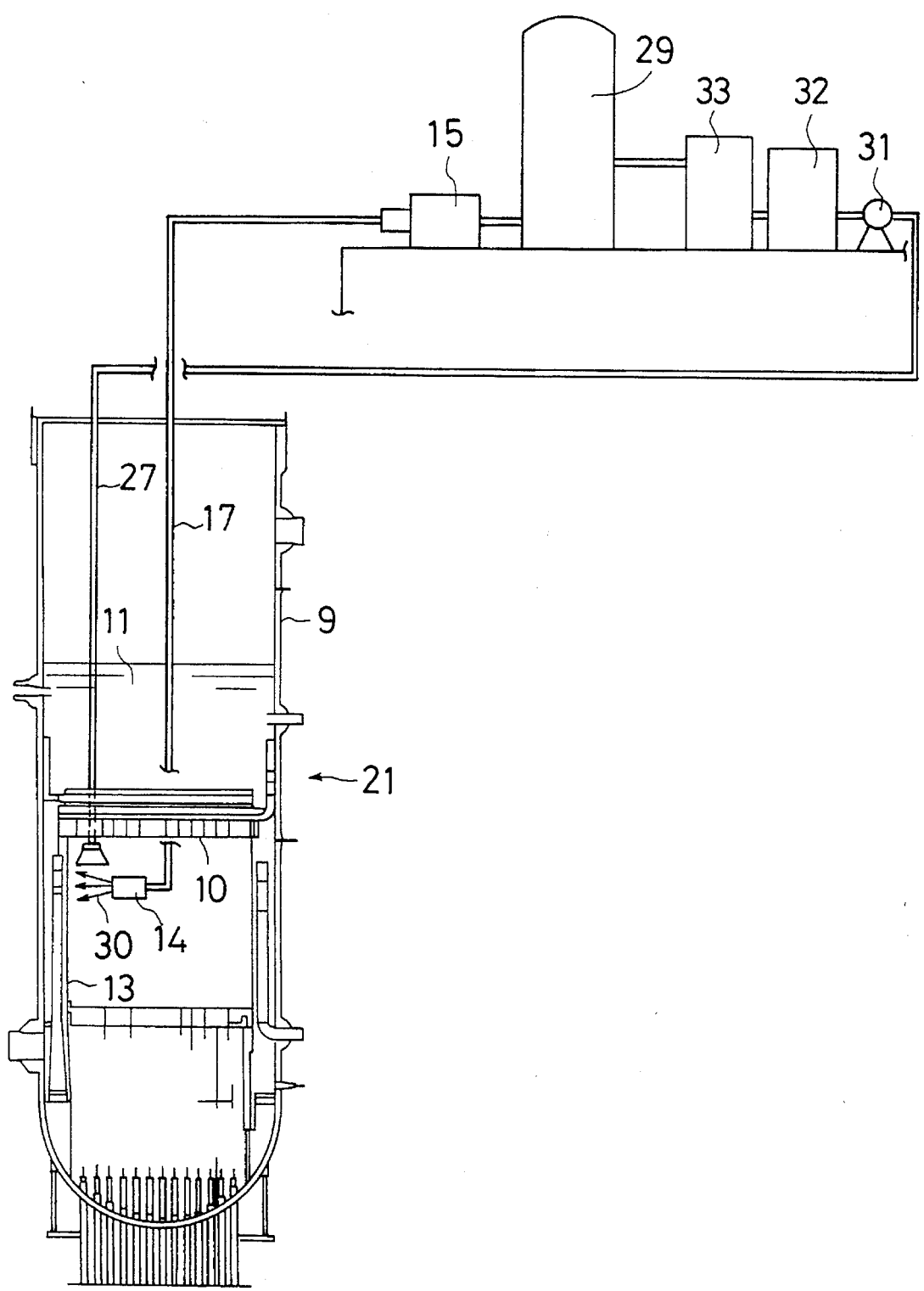
FIG. 8 is a sectional view of the reactor pressure vessel in the condition where a residual stress improving method according to a third embodiment of the present invention is applied.

Note that identical components in FIG. 8 to those in FIG. 7 are denoted by the same reference numerals.

Arrangements of this embodiment shown in FIG. 8 are different from those of the Second embodiment shown in FIG. 7 in that the suction hose 27 is connected through a suction pump 31 to a cleaning apparatus 32 for separating contaminants and pure water, the cleaning apparatus 32 is connected to a cooler 33, and the cooler 33 is connected to a cold reactor water tank 29.

Specifically, the reactor water sucked through the suction hose 27 conveyed to the cleaning apparatus 32 for separation from contaminants. The cleaned water is cooled by the cooler 33 and then supplied to the cold reactor water tank 29.

The reactor water in the cold reactor water tank 29 is pumped by the high pressure pump 15 and is ejected under pressure as a high speed cold reactor water jet 30 from the nozzle 14 through the conductor 17.

Incidentally, the contaminants separated by the cleaning apparatus 32 is sent to a contaminant treating apparatus (not shown) for treatment.

With this embodiment, the reactor water 11 will not be contaminated by addition of the working water into the reactor pressure vessel as with the second embodiment.

Also, since the cold reactor water jet 30 and the water supplied to the high pressure pump 15 are recirculated through a closed loop, the reactor water 11 is held at a substantially constant level in the reactor. Therefore, adjustment of the water level in the reactor is not almost required or much simplified when the residual stress improving operation is completed.

Further, since the cooler 33 is provided, the temperature difference $\Delta T$ can be enlarged and the greater residual stress improving effect can be achieved correspondingly.

A fourth embodiment of the present invention will be described below with reference to FIG. 9.

In this embodiment, an elbow-shaped nozzle is used as the nozzle.

Figure 9:
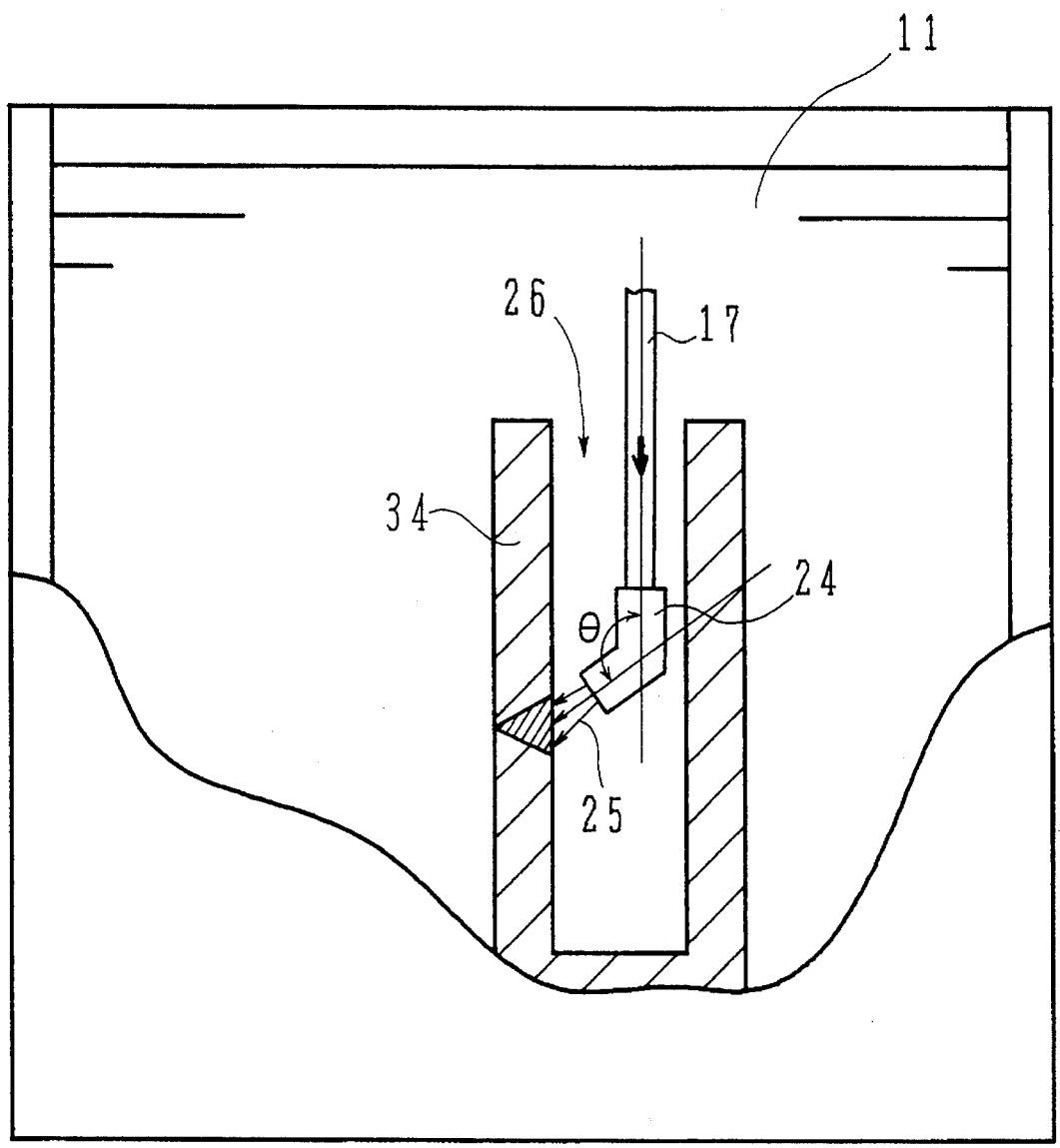
FIG. 9 is a sectional view of part of the reactor pressure vessel in the condition where a residual stress improving method according to a fourth embodiment of the present invention is applied.

FIG. 9 shows arrangements for ejecting the cold water jet according to a residual stress improving method of this embodiment.

Note that identical components in FIG. 9 to those in the first and second embodiments are denoted by the same reference numerals.

The arrangements shown in FIG. 9 are different from those of the first embodiment in that an elbow-shaped nozzle 24 for ejecting a high speed cold water jet 25 at an angle θ with respect to the direction in which the cold water is introduced through the conductor 17 (i.e., the downward direction indicated by arrow in FIG. 9), enabling the desired operation to be performed in a narrow space 26 inside an illustrated cylindrical member 34, for example.

The other arrangements except the nozzle and the operation steps are substantially the same as in the first embodiment.

With this embodiment, since the elbow-shaped nozzle 24 is used as the nozzle, the residual stress improving operation can be performed not only in a wide space, but also in the narrow space 26 by ejecting the cold water jet 25 to impinge against the member surface in the reactor pressure vessel.

It is thus possible to cause stress by a high thermal shock and to enhance both the residual stress improving effect and the cleaning effect.

Although the angle θ is selected from the range of 180° to 90° depending on narrowness of the space 26 in which the operation is to be carried, it is preferably set to 90° for the purpose of achieving the residual stress improving effect and the cleaning effect as high as possible.

The following features can be provided by any of the foregoing embodiments.

As the first step, the water jet in the form of a high speed submerged water jet at low temperature is ejected to impinge against and cool a partial surface region of the member in the reactor pressure vessel, the surface region being in a tensile stress residual state. Therefore, the surface layer is subjected to tensile stress by a thermal shock to cause tensile strain and, simultaneously, it is partly yielded.

Then, as the second step, the impingement of the water jet against the partial surface region of the member in the reactor pressure vessel is stopped, i.e., cooling of the partial surface region, is finished, allowing the same region to be heated against to the same level as the temperature of the surrounding water environment. Therefore, the thermal shock stress disappears, and the partial surface region of the member in the reactor pressure vessel elastically reverts from the partly yielded state, for improvement to a state where tensile stress is relieved or to a compressive residual stress state.

Accordingly, the occurrence of intergranular stress corrosion cracking can be prevented.

When oxide scales or other contaminants are deposited on the surface layer, the oxide scales or the other contaminants are contracted by rapid cooling to cause shear strain at the boundary between the contaminants and the surface layer, allowing the contaminants to be easily peeled off. Therefore, cleaning of the contaminants on the members in reactor pressure vessel surface can be accelerated.

As a result, crevice aided stress corrosion cracking, fatigue cracking or the like induced by the oxide scales or the like can be prevented.

Further, the residual stress improving operation can be simply performed by simple arrangements with no need of disassembling or dismantling the core shroud in the reactor pressure vessel.

As will be seen from the foregoing embodiment, the present invention includes total eleven inventions from claim 1 (first invention) to claim 11 (eleventh invention) as defined in the attached claims.

According to the first invention, in the first step, since the water jet in the form of a high speed submerged water jet at low temperature is ejected to impinge against and cool a first region of a surface of members in reactor pressure vessel in a tensile stress residual state, the temperature of only a surface layer in the first region against which the water jet impinges is lowered to produce the transient temperature difference ΔT between the surface layer and a subsurface layer. Therefore, the surface layer is subjected to tensile stress by a thermal shock to cause tensile strain and, simultaneously, it is partly yielded. Then, in the second step, since the impingement of the water jet against the first region is stopped, i.e., cooling of the first region, is finished so that the first region is heated again, the temperature difference ΔT is eliminated and the thermal shock stress disappears. Therefore, the surface layer in the first region of the surface of members in reactor pressure vessel reverts from the partly yielded state, for improvement to a state where tensile stress is reduced or to a compressive residual stress state. Accordingly, the occurrence of intergranular stress corrosion cracking can be prevented. When oxide scales or other contaminants are deposited on the surface layer, the oxide scales or the other contaminants are contracted by rapid cooling to cause shear strain at the boundary between the contaminants and the surface layer, allowing the contaminants to be easily peeled off. Therefore, cleaning of the contaminants on the surface of members in reactor pressure vessel can be accelerated. As a result, crevice aided stress corrosion cracking, fatigue cracking or the like induced by the oxide scales or the like can be prevented. Further, the residual stress improving operation can be simply performed by simple arrangements with no need of disassembling or dismantling structural members in a reactor pressure vessel.

According to the second invention, in the second step, the nozzle is moved while ejecting the water jet from the nozzle such that the water jet impinges against the surface of members in reactor pressure vessel successively from the first region to a different second region. In addition to the operating advantages of the first invention, therefore, the second step of heating the first region again can be realized without stopping the ejection, of the water jet from the nozzle.

According to the third invention, in the second step, the ejection of the water jet from the nozzle is stopped. In addition to the operating advantages of the first invention, therefore, the second step of heating the first region again can be realized without moving the nozzle.

According to the fourth invention, an initial ejection speed of the water jet from the nozzle is not less than 100 m/s, but not larger than 700 m/s. In addition to the operating advantages of any of the first through third inventions, therefore, heat conductivity in the cooling process is increased to enhance the rapid cooling effect, and the satisfactory residual stress improving effect can be provided.

According to the fifth invention, the initial ejection speed of the water jet from the nozzle is not less than 200 m/s, but not larger than 400 m/s. In addition to the operating advantages of any of the first through third inventions, therefore, a possibility that scales peeled off from the members in reactor pressure vessel materials may give rise to an adverse effect due to their grinding action, and a sufficient degree of reliability and durability of the equipment, such as the high pressure hose and the high pressure pump, can be ensured in view of even influences of a great reaction force caused by the ejection of the water jet and severe radiation environment.

According to the sixth invention, the initial ejection speed of the water jet from the nozzle is not less than 250 m/s, but not larger than 350 m/s. In addition to the operating advantages of any of the first through third inventions, therefore, operability of the nozzle and handling facility of the high pressure hose are improved.

According to the seventh invention, a source of the water jet is low temperature water obtained by cooling the reactor water and pumping the same under pressure. In addition to the operating advantages of any of the first through third inventions, therefore, the reactor water is held at a substantially constant level during the residual stress improving operation and, hence, adjustment of the water level in the reactor is not almost required or much simplified when the residual stress improving operation is completed.

According to the eighth invention, the source of the water jet is low temperature water prepared outside the reactor and pumped under pressure. In addition to the operating advantages of any of the first through third inventions, therefore, a means for supplying the low temperature water to eject the water jet can be realized with no need of the specific cooler.

According to the ninth invention, the source of the water jet is low temperature pure water prepared outside the reactor and pumped under pressure. In addition to the operating advantages of any of the first through third inventions, therefore, the reactor water at high temperature will not be contaminated by addition of working water. As a result, the means for supplying the low temperature water to eject the water jet can be realized while minimizing contamination of the reactor water. Also, if the pure water is obtained from a pure water storing tank installed in the nuclear plant for resupply of the reactor water or other purposes, there is no need of providing any separate low temperature water supplying means.

According to the tenth invention, the water jet is high speed jet water including cavitation bubbles. In addition to the operating advantages of any of the first through third inventions, therefore, a high speed turbulent flow is generated to enhance the cooling effect, resulting in that stress is caused by a stronger thermal shock and the residual stress improving effect is enhanced correspondingly. Further, when the cavitation bubbles impinge against the surface of members in reactor pressure vessel material surface and collapse there, high pressure is produced to induce bearing stress in the surface of a member in the reactor pressure vessel. As a result, the residual stress improving effect by peening is developed in addition to the thermal effect of improving residual stress.

According to the eleventh invention, the nozzle is a an elbow-shaped nozzle for ejecting the high speed submerged water jet at a predetermined angle with respect to the inflow direction of high pressure water supplied to the nozzle. In addition to the operating advantages of any of the first through third inventions, therefore, the water jet can be ejected to impinge against the surface of members in reactor pressure vessel even when the operation is to be carried out in a narrow space, enabling stress to be caused by a strong thermal shock.

What is claimed is:

1. A residual stress improving method for members in reactor pressure vessel, comprising:

a first step of ejecting, toward a first region in a surface of members in reactor pressure vessel submerged in reactor water, a water jet in the form of a high speed submerged water jet at temperature lower than any temperatures of said reactor water and said members in reactor pressure vessel from a nozzle to impinge against said first region in water environment; and a second step of stopping the impingement of said water jet against said first region, allowing said first region to be heated again.

2. A residual stress improving method for members in reactor pressure vessel according to claim 1, wherein said second step comprises moving said nozzle while ejecting said water jet from said nozzle such that said water jet impinges toward a second region different from said first region of members in reactor pressure vessel.

3. A residual stress improving method for members in reactor pressure vessel according to claim 1, wherein said second step comprises stopping the ejection of said water jet from said nozzle.

4. A residual stress improving method for members in reactor pressure vessel according to claim 1, 2 or 3, wherein an initial ejection speed of said water jet from said nozzle is not less than 100 m/s, but not larger than 700 m/s.

5. A residual stress improving method for members in reactor pressure vessel according to claim 1, 2 or 3, wherein an initial ejection speed of said water jet from said nozzle is not less than 200 m/s, but not larger than 400 m/s.

6. A residual stress improving method for members in reactor pressure vessel according to claim 1, 2 or 3, wherein an initial ejection speed of said water jet from said nozzle is not less than 250 m/s, but not larger than 350 m/s.

7. A residual stress improving method for members in reactor pressure vessel according to claim 1, 2 or 3, wherein a source of said water jet is low temperature water obtained by cooling said reactor water and pumping the same under pressure.

8. A residual stress improving method for members in reactor pressure vessel according to claim 1, 2 or 3, wherein a source of said water jet is low temperature water prepared outside the reactor and pumped under pressure.

9. A residual stress improving method for members in reactor pressure vessel according to claim 1, 2 or 3, wherein a source of said water jet is low temperature pure water prepared outside the reactor plant and pumped under pressure.

10. A residual stress improving method for members in reactor pressure vessel according to claim 1, 2 or 3, wherein said water jet is high speed jet water including cavitation bubbles.

11. A residual stress improving method for members in reactor pressure vessel according to claim 1, 2 or 3, wherein said nozzle is a an elbow-shaped nozzle for ejecting said high speed submerged water jet at a predetermined angle with respect to the inflow direction of high pressure water supplied to said nozzle.

* * * * *